March 27, 1951 E. O. ROGGENSTEIN 2,546,784

PUNCH TAPE SENSING CONDENSER

Filed Feb. 12, 1948 3 Sheets-Sheet 1

INVENTOR
E.O. ROGGENSTEIN
BY Anthony Martini
AGENT

March 27, 1951 E. O. ROGGENSTEIN 2,546,784

PUNCH TAPE SENSING CONDENSER

Filed Feb. 12, 1948 3 Sheets-Sheet 2

INVENTOR
E.O.ROGGENSTEIN
BY Anthony Mantione
AGENT

PUNCH TAPE SENSING CONDENSER

Filed Feb. 12, 1948 3 Sheets-Sheet 3

INVENTOR
E.O.ROGGENSTEIN
BY Anthony Manteone
AGENT

Patented Mar. 27, 1951 2,546,784

UNITED STATES PATENT OFFICE 2,546,784

PUNCH TAPE SENSING CONDENSER

Edwin O. Roggenstein, Ilion, N. Y., assignor to Remington Rand Inc., New York, N. Y., a corporation of Delaware Application February 12, 1948, Serial No. 7,935

3 Claims. (Cl. 250—36)

This invention relates to business machines and more particularly to capacitative sensing of information recorded in the form of holes of different sizes in either conductive or dielectric material.

In devices of this type one or more of the factors determining the capacity of a capacitor are varied to change the capacity of a capacitor and by use of associated circuits produce a voltage dependent upon the capacity. The nature or thickness of the dielectric, the area or the separation of the plates may be varied to give this result. It will be seen from an examination of the formula $$\left(C=\frac{0.224KA}{d}\right)$$

that variations in the effective area of the plates cause linear results. This is also true of variations in the nature of the dielectric. This invention deals with devices utilizing these principles.

The invention contemplates a capacitive apparatus for the sensing of flat sheets of record material having data recorded thereon in a code suitable for controlling business machines, the respective elements or characters of the code being recorded by holes of different sizes punched in the record material.

This may be done in several ways. One such device is disclosed in my co-pending application S. N. 3,341, filed January 20, 1948, now Patent 2,512,879 issued June 27, 1950. Of those to be described here, one has means for feeding a metallic or metallized tape, having holes of varying sizes punched into it, beneath a positively charged plate. The tape is separated from this plate by a disc of dielectric material of equal area. A source of negative potential is connected to the tape so that the tape forms the second plate of the sensing condenser. The presence of holes in the tape changes the effective area of the condenser in accordance with the position of the moving tape.

Another device employs means for feeding a tape of dielectric material, punched with holes of varying sizes, between two metal plates having a potential applied across them. The size of the hole determines the relative amounts of solid dielectric and air within the effective volume of the condenser and so its capacity. These changes in capacity are utilized as before.

Variations in the thickness of the record material also change capacity and two means have been devised to compensate for these changes.

One such means is to insert a smaller plate within the larger upper plate mounted so that it is free to move within the larger upper plate in response to variations in the thickness of the dielectric material. This smaller plate is electrically insulated from the larger upper plate and forms a capacitor with it. The two capacitors so formed are connected in parallel and the arrangements are such that an increase in dielectric thickness reduces the capacity of the main capacitor and increases the capacity of the auxiliary capacitor by an equal amount thus compensating for irregularities in the thickness of the dielectric.

Another means is to have a similar auxiliary plate that mechanically communicates its motion to a movable plate associated with a fixed plate to again form a capacitor that has its capacity increased by an increase in thickness of the dielectric to the same extent that the capacity of the main capacitor is reduced. The two capacitors are connected in parallel as before to give a compensating effect.

An object of this invention is to produce a variation of an electrical signal in accordance with variations in the areas of holes in a record material.

Another object of this invention is to make these electrical signals independent of variations in the thickness of the record material.

Another object of the invention is to make the signal amplitudes vary linearly with the size of the hole.

Still another object of the invention is to sense the information from a plurality of holes spaced across the width of the recording medium.

Still another object of this invention is to sense information presented in the form of holes in dielectric material.

Still another object of this invention is to sense information presented in the form of holes in conductive material.

The invention will be more clearly understood from the following description taken in connection with the accompanying drawings in which Figure 1 is a block diagram of the sensing unit;

Figure 1:
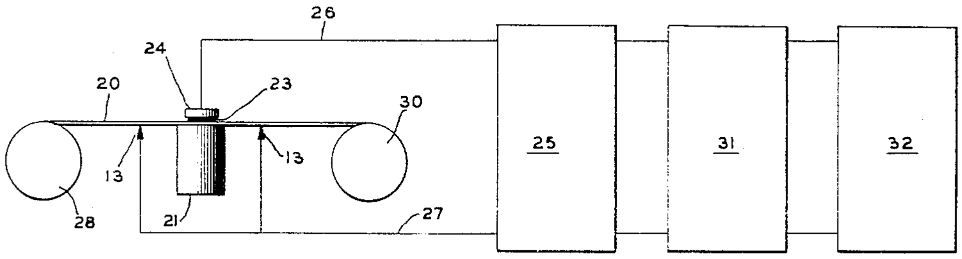

Referring to Fig. 1, the numeral 20 refers to the record bearing material, in this case, metal tape resting on an anvil 21 and having punched in it holes 22 positioned under a plate of dielectric material 23 and a conductive metal plate 24. The metal tape 20, the dielectric plate 23 and the metal plate 24 form a condenser that is connected across the tank circuit of an oscillator 25 by leads 26 and 27. The lead 26 connects one end of the tank circuit and the plate 24 and the lead 27 connects the other end of the tank circuit and the contacts 43. The tape 20 is carried under the plates 23 and 24 by sprocket wheels 28 and 30. The output of this oscillator is converted into variations in a direct current in a discriminator or converting circuit represented schematically by the block 31 which is described in detail in applicant's above mentioned application Serial No. 3,341, now Patent 2,512,879 issued June 27, 1950. This varying direct current is applied to the utilization circuit represented schematically by the block 32 which may consist of relays and solenoids.

As the record bearing material is drawn under plates 23 and 24, changes in the size of the holes 22 punched therein change the effective area within the electrostatic field between the plate 24 and the metal tape 20. The changes in the capacity of the tank circuit of the oscillator 25 vary its frequency. These frequency changes are converted into varying direct current by the converter 31 and utilized by means of relays and solenoids in the circuits schematically represented by the block 32. These circuits may be similar to those shown in my copending application Serial No. 3,341, filed January 20, 1948, now Patent 2,512,879 issued June 27, 1950.

Figure 2:
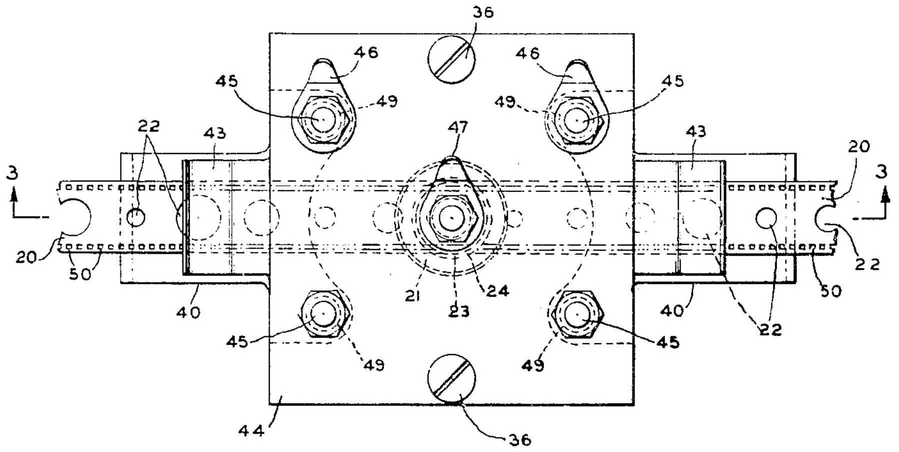
Fig. 2 is a top view of the capacitor and metal tape.
Figure 3:
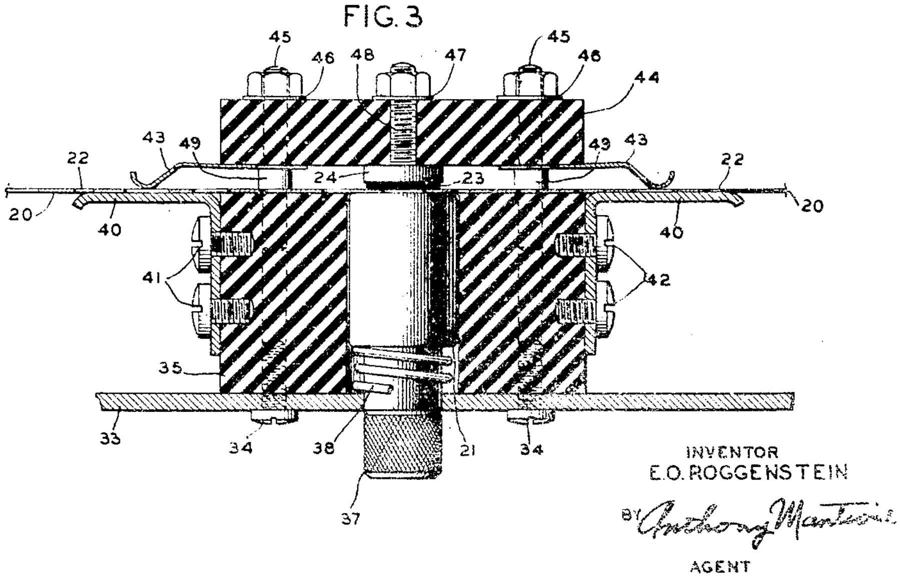
Fig. 3 is a section along the lines 3—3 of Fig. 2.

The sensing head is shown in more detail in Figs. 2 and 3. It is mounted on a frame 33 by screws 34 fixed into a dielectric block 35 that carries an anvil 21 the lower end of which is provided with a knurled portion 37 for facilitating manual vertical movement of the anvil. The anvil is urged upwardly against the tape 20 by means of a spring 38. Supporting brackets 40 are mounted on either side of the block 35 by screws 41 and 42. Contact is made with the tape by the pressure of contact springs 43 attached to the insulating block 44 by the bolts 45 formed with an enlarged section 49 that acts as a spacer between the blocks 35 and 44. They also provide electrical connection from the lead 27 to the contact springs 43 through the lugs 46. The upper plate 24 is connected to the circuit through lug 47 on the screw 48 that attaches the plate 24 to the block 44. The insulating blocks 35 and 44 are held together by screws 36. The bolts 45 by fitting into recesses in the block 35 serve to align the blocks 35 and 44. The provision of two contact springs 43 is for the purpose of maintaining an established circuit at the end of the tape run in either direction.

The metal tape 20 is best shown in Fig. 2. Holes 22 of various sizes are punched in the tape 20. The respective sizes may each represent a character or a digit according to a desired code. This tape may be fed between the plates by sprocket holes 50 cooperating with sprocket wheels 28 and 30 shown in Fig. 1 driven in any convenient manner.

Figure 4:
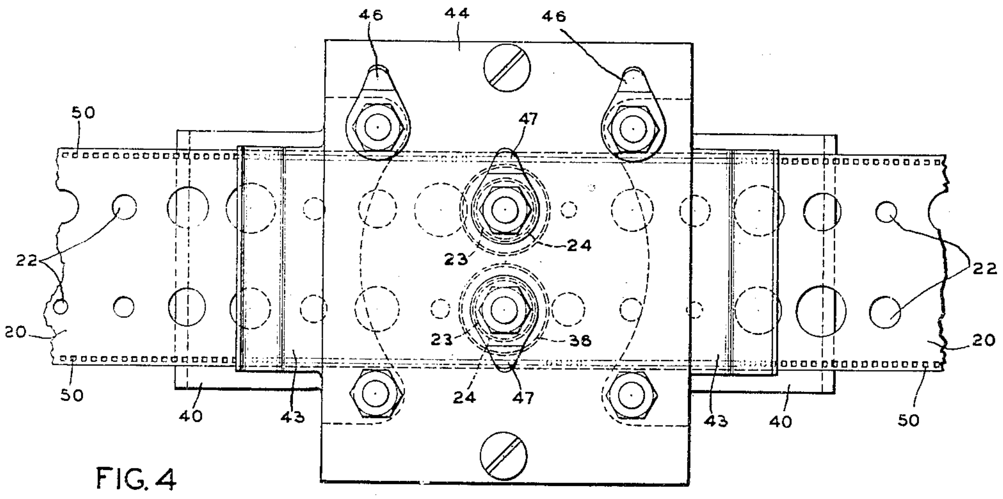
Fig. 4 is a plan view partly in phantom of two of the capacitors shown in Figs. 2 and 3 combined into a single unit.

A plurality of laterally spaced holes may be sensed by the modification shown in Fig. 4. The only change is that the plate 24 and dielectric plate 23 and the anvil 21 assemblies are duplicated. The contact springs 43 and associated bolts 45 and lugs 46 remain the same except for size.

When tape 20 bearing information in two laterally spaced holes 22 is passed through the device first one capacitor 24—23—20 is switched in to the tank circuit of the oscillator and then the other. By suitable arrangements of the utilization circuits in 32 the first capacitor may be used to select one of several groups of devices and the second to select one among the selected group.

Figure 5:
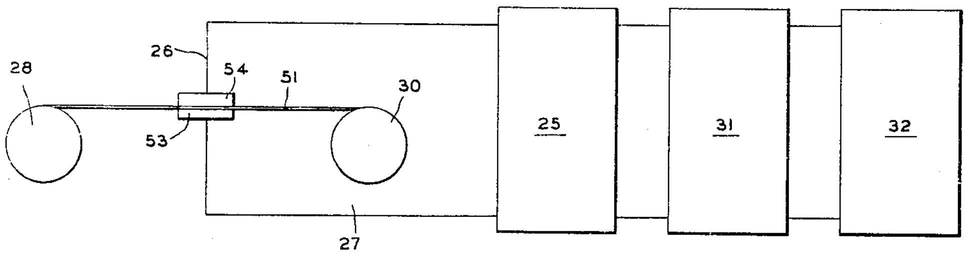
Fig. 5 is a block diagram of another embodiment of the sensing unit.
Figure 6:
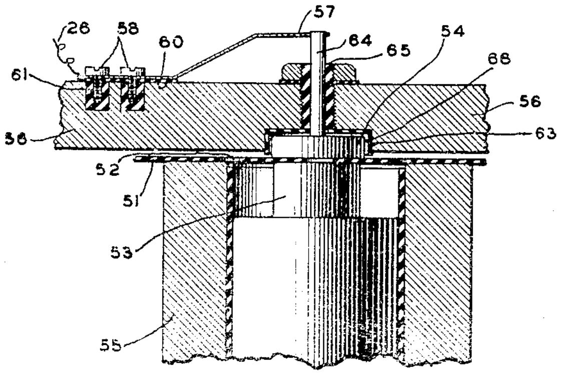
Fig. 6 is a vertical section of the capacitor and tape of the embodiment shown in Fig. 5.
Figures 7, 8, 9:
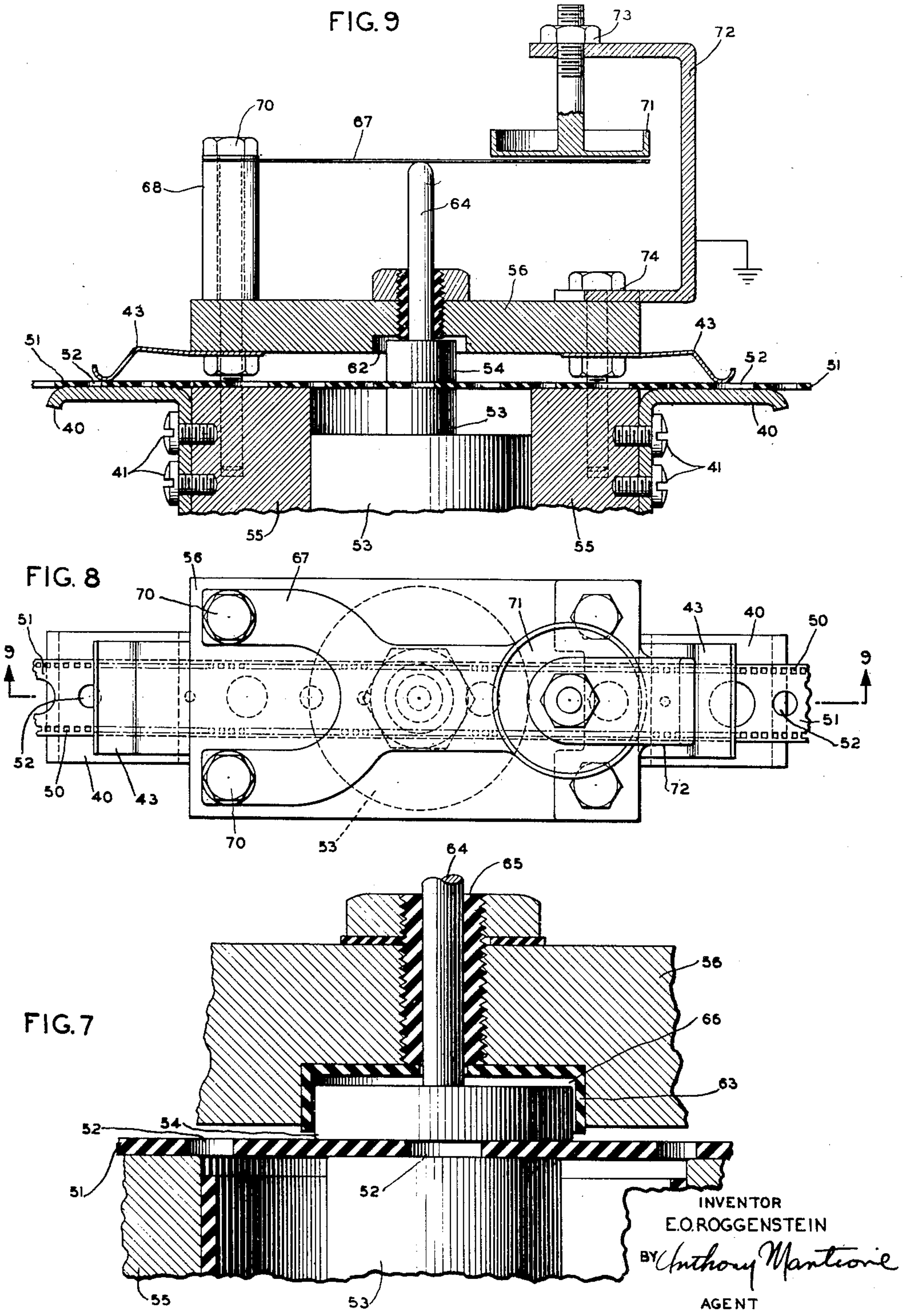
Fig. 7 shows a portion of the capacitor shown in Fig. 6 on an enlarged scale to disclose a method of compensating for irregularities in the thickness of the tape.
Fig. 8 is a top view of a modification of the compensating feature.
Fig. 9 is a section taken through 9—9 of Fig. 8.

Another principle is utilized in the embodiment shown in Figs. 5, 6 and 7. Variations in the characteristic of the dielectric of a capacitor vary the capacity of the capacitor formed by the two plates and the dielectric record material between them. A dielectric record material 51 pierced with holes 52 is passed between two plates 53 and 54 by the sprocket wheels 28 and 30. The resulting capacitor is connected across the tank circuit of the oscillator 25 by the leads 26 and 27. With solid dielectric between the plates 53 and 54 the capacitor will have one capacity. With a hole 22 in that portion of the dielectric between the plates, the dielectric is partially air and partially the material of the record bearing medium 51. This shifts the effective dielectric constant of the capacitor by an amount dependent upon the relative proportion of air and solid material between the plates 53 and 54. These proportions are determined by the size of the hole 52. These changes in capacity shift the frequency of operation of the oscillator 25 as described in connection with Figs. 1, 2 and 3 and the shifts are translated into changes in the amplitude of an electrical current by the converting circuit 31 as described above. These variations in electrical current are utilized as already described in a circuit 32.

The construction of the condenser is shown more in detail in Fig. 6. The record bearing medium 51 is supported on the lower metallic plate 53 that is mounted in a block 55 in any convenient manner and connected to the external circuit. The upper plate 54 is supported in another block 56 and a spring 57 of conductive material mounted upon the block 56 by screws 58, but insulated from it by the insulating strip 60 and insulating plugs 61 in such a manner as to permit the lead 26 to be connected to it.

This type of sensing capacitor can be used in tandem to sense two or more holes spaced laterally across the tape 51 in much the same manner as the metal tape embodiment shown in Figs. 1, 2, 3 and 4 and described above.

Inaccuracies may be introduced into the device by irregularities in the thickness of the dielectric record bearing medium 51. These irregularities will vary the relative proportions of dielectric and air between the plates 53—54 of the capacitor. Thin spots will increase the capacity by decreasing the separation of the plates 53 and 54.

Figs. 6 and 7 show a method of compensating for this source of error. The upper plate 54 is vertically movable into a recess in the upper block 56 that is lined with insulating material 63. The upper plate 54 has a rod portion 64 that is carried through a hole in the block 56 by a bushing 65 of dielectric material so that the upper plate 54 is insulated from the conductive material of the block 56 by an air gap 66, the insulating lining 63 and the bushing 65 to form a second capacitor. The plate 54 is urged downward by spring 57 so as to always be in contact with the record bearing material 51. As a thin portion of the record material is reached, the plate 54 is thrust downward increasing the capacity of the main condenser. At the same time the smaller capacity formed by the upper side of the plate 54, the block 56, the lining 63 and air gap 66 is reduced by the increase in the air gap. When a thicker portion of the record material 51 passes, the plate 54 is thrust upward by the tape 51 reducing the capacity of the main condenser 53—54 and increasing the capacity of the supplementary condenser 54, 56, 63 and 66. When the two capacitors are connected in parallel across the tuned circuit of the oscillator 25 this reciprocal action gives the desired compensation.

This compensating action can be increased by the structure shown in Figs. 8 and 9. The upper plate 54 is as before free to move in a recess in the upper dielectric block 56 and communicates its movement by the metal rod 64 in response to the varying thickness of the record carrying medium 51 to a thin, flat, spring-like conductive plate 67 that may be made of beryllium copper shaped as shown in Fig. 8 . This plate 67 is fixed at one end to the studs 68 by bolts 70. The rod 64 varies the spacing of the free end area of plate 67 from a second plate 71 adjustably supported in a bracket 72 by the nut 73 with changing thickness of the tape 51. The bracket 72 is attached to the upper dielectric block 56 by the stud 74. The conductive plate 67 is electrically connected to the upper plate 54 and the second upper plate 71 is connected to ground.

As a thicker portion of the record material 51 comes into sensing position the plate 54 is thrust upward, this motion is communicated to the beryllium plate 67 by the rod 64 moving the plate 67 nearer to the second upper plate 71 to increase the capacity of the capacitor formed by these two plates 67 and 71 and the air gap between them. When the two capacitors are connected in parallel this compensates for the reduction in capacity caused by the increased separation of the main plates 53 and 54. With a thin spot in the record material, the action is reversed. The capacity of the main condenser 53—54 increases due to the main plates moving together and the capacity of the auxiliary condenser 67—71 is reduced due to its plates moving apart. The amount of this compensation may be determined by adjusting the size of the auxiliary plates 67 and 71 and their normal distance apart by means of the nut 73.

While I have described what I consider to be highly desirable embodiments of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim is:

1. In a device of the character described, an oscillator having a tuned circuit including two capacitors, a record carrying medium having variations in area along its length and also variations in thickness, one capacitor including an upper plate of conductive material, the other capacitor including said plate and a second plate occupying a recess in the first plate and insulated from it, said second plate being free to move in and out of the recess in response to the variations in thickness of the record material, means to connect the two capacitors in parallel so that increases in thickness of the record material will decrease the capacity of one capacitor by increasing the spacing of its plates and increase that of the other by decreasing the spacing of its plates to retain the total capacity of the two constant for the same area of dielectric material in a unit length of the record material regardless of variations in its thickness and circuit means including a plurality of magnetic devices selectively operable by the oscillator in accordance with the frequency thereof.

2. In a device of the character described, an oscillator having a tuned circuit including a first and second capacitor, a record carrying medium having variations in area along its length and also variations in thickness, the first capacitor including an upper plate of conductive material substantially parallel to the record bearing material, a supporting structure of dielectric material having a recess in which said conductive plate fits and is free to move in response to variations in the thickness of the record material, the second capacitor including a fixed plate and a movable plate, means to communicate the movements of the movable plate of the first capacitor in response to variations in the thickness of the record material to a plate of the second capacitor, means to connect the two capacitors in parallel so that the changes in their capacity due to variations in the thickness of the record material and thus of the spacing of the plates of the respective capacitors are opposite in sense and thus compensate and circuit means including a plurality of magnetic devices selectively operable by the oscillator in accordance with the extent of the change in the frequency thereof.

3. In an apparatus of the character described, a record medium of dielectric material variably shaped according to the data recorded thereon, an oscillator, a capacitor for controlling the oscillator comprising two plates of conductive material, one of the plates being adapted to rest on the record medium so as to be displaced thereby with respect to the other plate in response to changing thickness of the record medium, means for feeding the record medium between the plates to vary the capacity of the capacitor and correspondingly change the frequency of the oscillator, means controlled by the last mentioned capacitor plate for compensating the capacitor for changing thickness of the record medium, a plurality of magnetic devices, and circuits therefor selectively operable by the oscillator according to the frequency thereof.

EDWIN O. ROGGENSTEIN.

REFERENCES CITED

The following references are of record in the file of this patent:

UNITED STATES PATENTS

| Number | Name | Date |
|---|---|---|
| 1,855,569 | Chireix | Apr. 26, 1932 |
| 1,924,087 | Allen | Aug. 29, 1933 |
| 2,302,081 | Weitman | Nov. 17, 1942 |
| 2,424,833 | Korman | July 29, 1947 |
| 2,445,663 | Doelz | July 20, 1948 |

FOREIGN PATENTS

| Number | Country | Date |
|---|---|---|
| 556,292 | Great Britain | Sept. 28, 1943 |